(12) United States Patent
Iacovelli et al.

(10) Patent No.: US 6,794,013 B1
(45) Date of Patent: Sep. 21, 2004

(54) HEAVY DUTY VEHICLE FLOOR MAT

(75) Inventors: Marc Iacovelli, Miami, FL (US); Saied Hussaini, Miami, FL (US)

(73) Assignee: Rally Manufacturing, Inc., Miami, FL (US)

( * ) Notice: Subject to any disclaimer, the term of this patent is extended or adjusted under 35 U.S.C. 154(b) by 211 days.

(21) Appl. No.: 09/698,265

(22) Filed: Oct. 30, 2000

(51) Int. Cl.[7] .............................................. B32B 7/00
(52) U.S. Cl. ........................... 428/120; 428/95; 428/99; 428/213; 296/97.23; 296/75; 5/417; 15/215
(58) Field of Search ........................... D12/203; 428/95, 428/120, 213, 99; 296/97.23, 75, 1 F; 5/417; 15/215

(56) References Cited

U.S. PATENT DOCUMENTS

| | | | |
|---|---|---|---|
| 2,501,819 A | 3/1950 | Kloepper | 180/54 |
| 2,602,724 A | 7/1952 | Batchelor | 21/61 |
| 2,735,434 A | 2/1956 | Rossett | 132/76.4 |
| 3,082,032 A | 3/1963 | Stata | 296/1 |
| 3,450,429 A | 6/1969 | Stata | 296/1 |
| 3,526,016 A | 9/1970 | Stata | 15/216 |
| 4,377,614 A | 3/1983 | Alfter et al. | 428/213 |
| 4,399,176 A * | 8/1983 | Bell et al. | 428/85 |
| 4,420,180 A | 12/1983 | Dupont et al. | 296/1 F |
| D278,525 S | 4/1985 | Morawski | D12/203 |
| 4,829,627 A | 5/1989 | Altus et al. | 16/4 |
| D309,444 S | 7/1990 | Charet et al. | D12/203 |
| D331,904 S | 12/1992 | Maresca | D12/203 |
| 5,215,348 A | 6/1993 | Wen-Hwang | 296/97.23 |
| 5,227,214 A | 7/1993 | Kerr et al. | 428/95 |
| D358,571 S | 5/1995 | Thundercloud | D12/203 |
| D358,572 S | 5/1995 | Thundercloud | D12/203 |
| 5,482,759 A * | 1/1996 | Primeau | 428/167 |
| D394,037 S | 5/1998 | Mauffette | D12/203 |
| D394,835 S | 6/1998 | Crute-Williams et al. | D12/203 |
| 5,776,583 A | 7/1998 | Peyton | 428/120 |
| 5,919,540 A * | 7/1999 | Bailey | 428/67 |
| D413,850 S * | 9/1999 | Wang | D12/203 |
| 6,027,782 A | 2/2000 | Sherman | 428/88 |
| D422,256 S * | 4/2000 | Lu | D12/203 |
| D429,679 S * | 8/2000 | Hussaini et al. | D12/203 |
| 6,155,629 A * | 12/2000 | Sherman | 296/97.23 |

* cited by examiner

Primary Examiner—Deborah Jones
Assistant Examiner—Jane Rhee
(74) Attorney, Agent, or Firm—Liniak, Berenato & White

(57) ABSTRACT

The invention is a molded flexible heavy-duty floor mat with attached metal wear plates designed to fit in the floor compartment area of a car, van, pick-up truck, sport utility or work vehicle. The floor mat surface is texturized with raised protrusions and ridges to provide non-slip shoe traction and shoe scraping surfaces. The floor mat has recessed areas, indentations, and channels to collect scraped or loosened debris and moisture. A peripheral double lip or wall contains the debris and moisture on the floor mat. The attached wear plates are texturized for additional scraping and traction purposes and are attached in areas of the floor mat which are most susceptible to wear, such as near the vehicle pedals and in the stepping area of the floor mat. The floor mat has back gripping area to secure and maintain the mat against the vehicle floor. The mat may be readily cleaned by removing the entire mat out from the vehicle.

18 Claims, 6 Drawing Sheets

Fig. 3
Fig. 4
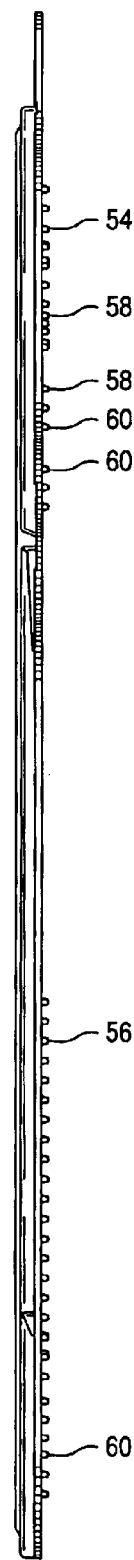

HEAVY DUTY VEHICLE FLOOR MAT

BACKGROUND OF THE INVENTION

The invention relates to floor mats for automobiles and especially floor mats designed for use with construction vehicles, load hauling vehicles, or other heavy duty work vehicles. In such work vehicles the vehicle driver or passengers may be wearing rugged work boots which tend to accumulate mud, moisture, and debris build-up that is ultimately deposited on the floor of the work vehicle. Worker's boots also tend to be more damaging to an interior floor of the work vehicle due to the heavy and rugged sole construction.

It has long been the practice to cover the interior areas of an automobile which are subjected to heavy wear with separate floor mats, whether or not such interior areas are previously carpeted. It has been important in the design of floor mats to attempt to collect and store water and debris from shoes of drivers and passengers. Prior floor mat construction have also been designed with means to retain the floor mat in a proper position within the vehicle to prevent twisting or riding up of the floor mat under the vehicle pedals. It has also been recognized that it is necessary for a floor mat to neatly fit the area it covers without folds, wrinkles, or buckles, which may interfere with the operation of the vehicle. In view of the concerns of the prior art and the additional requirements of a work vehicle application, the apparent advantages and objects of the invention will be described hereinafter.

It is an object of the invention to provide a durable heavy-duty floor mat for use in construction or other work vehicles. It is a further object of the invention to provide a floor mat for collecting debris and moisture associated with work vehicles. Another object of the invention is to provide an extra-durable surface in areas of the floor mat most susceptible to wear. A specific object of the invention is to provide a shoe traction surface and a shoe-scraping surface on a floor mat. It is a further object of the invention to achieve a snug fit of a vehicle floor mat without substantial folds or wrinkles.

SUMMARY OF THE INVENTION

The invention is vehicle floor mat constructed to form a molded flexible mat. The mat has a raised peripheral lip provided on side edges of the molded mat. A first area of the mat is contained within the peripheral lip. The first area has a recessed bottom surface and a plurality of raised protrusions extending from the bottom surface in order to provide a texturized surface, with a first texturized surface pattern. A second area of the mat is also contained within the peripheral lip. The second area has a recessed floor and a plurality of elongated parallel ridges protruding from the recessed floor, providing the second area with a second texturized surface pattern different from the first pattern, The second area further comprises a plurality of raised bumps on the recessed floor in between the parallel ridges. The vehicle floor mat is designed so that the first area of the molded mat generally covers an upper section and a lower section of a substantial floor area of the mat, and the second area of the molded mat generally covers a middle section of the substantial floor area of the mat.

The floor mat has at least one wear plate fixed upon the bottom surface of the molded mat. The wear plates include a heel plate located in the lower section of the mat and a toe plate located in the upper section of the mat. The wear plate is surrounded at its edges by a contoured wall, which is raised and extends up from the bottom surface. The wear plate comprises a metal plate having a texturized surface pattern. The vehicle floor mat has a back side of the molded mat. The back side has at least one gripping section for gripping the vehicle floor. The gripping section having a plurality of outwardly extending protrusions which are slip-resistant. The gripping sections are located on the back side of the mat opposite the wear plates fixed to the front surface of the mat.

BRIEF DESCRIPTION OF THE DRAWINGS

The above mentioned advantages and objects of the present invention will further become apparent when taken with the detailed description of the invention and with the drawings in which:

FIG. 3 is a left side view of FIG. 1;

FIG. 4 is a left side view of FIG. 2;

DETAILED DESCRIPTION OF THE INVENTION

Figure 1:
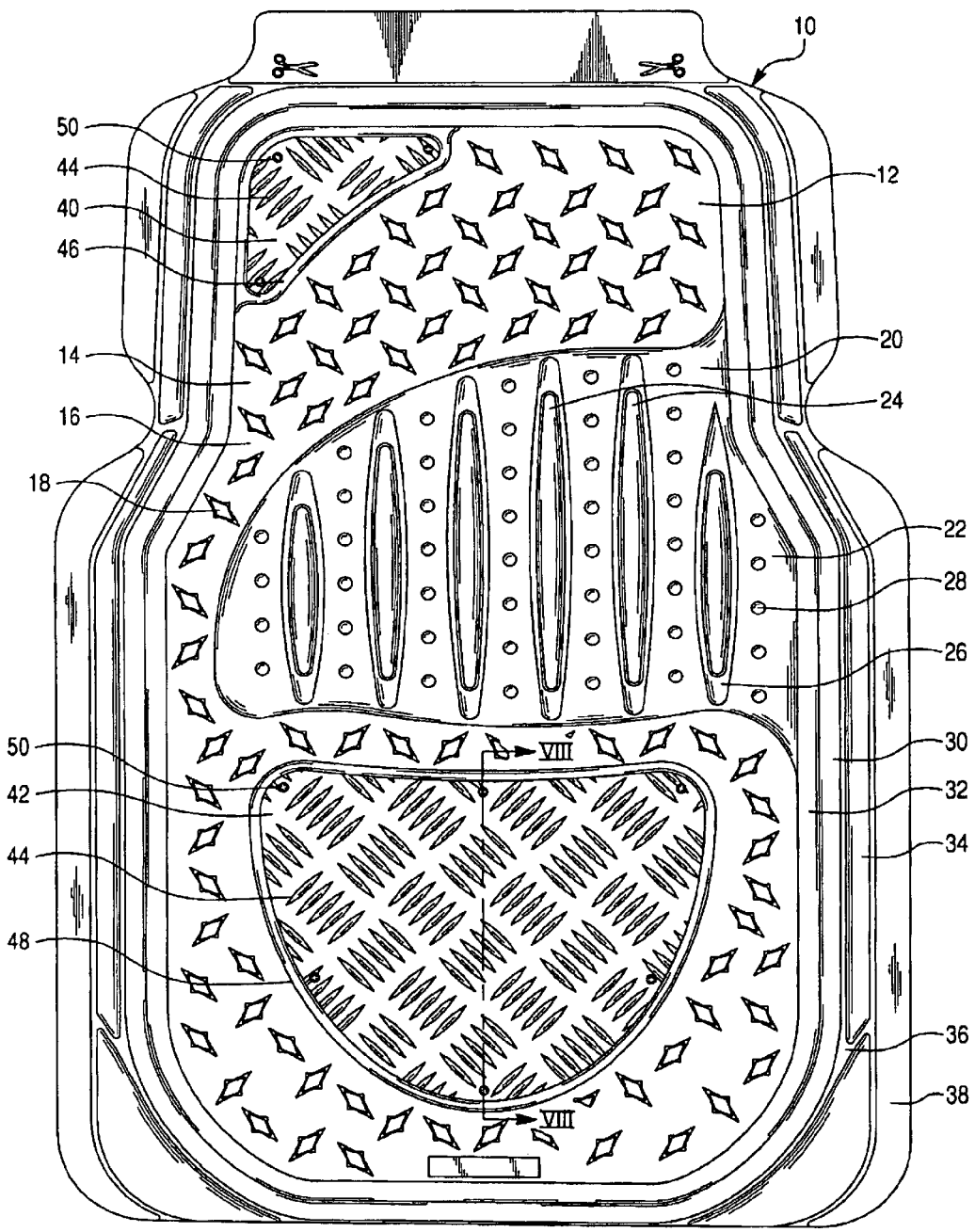
FIG. 1 is a top plan view of a floor mat according to the present invention.
Figure 2:
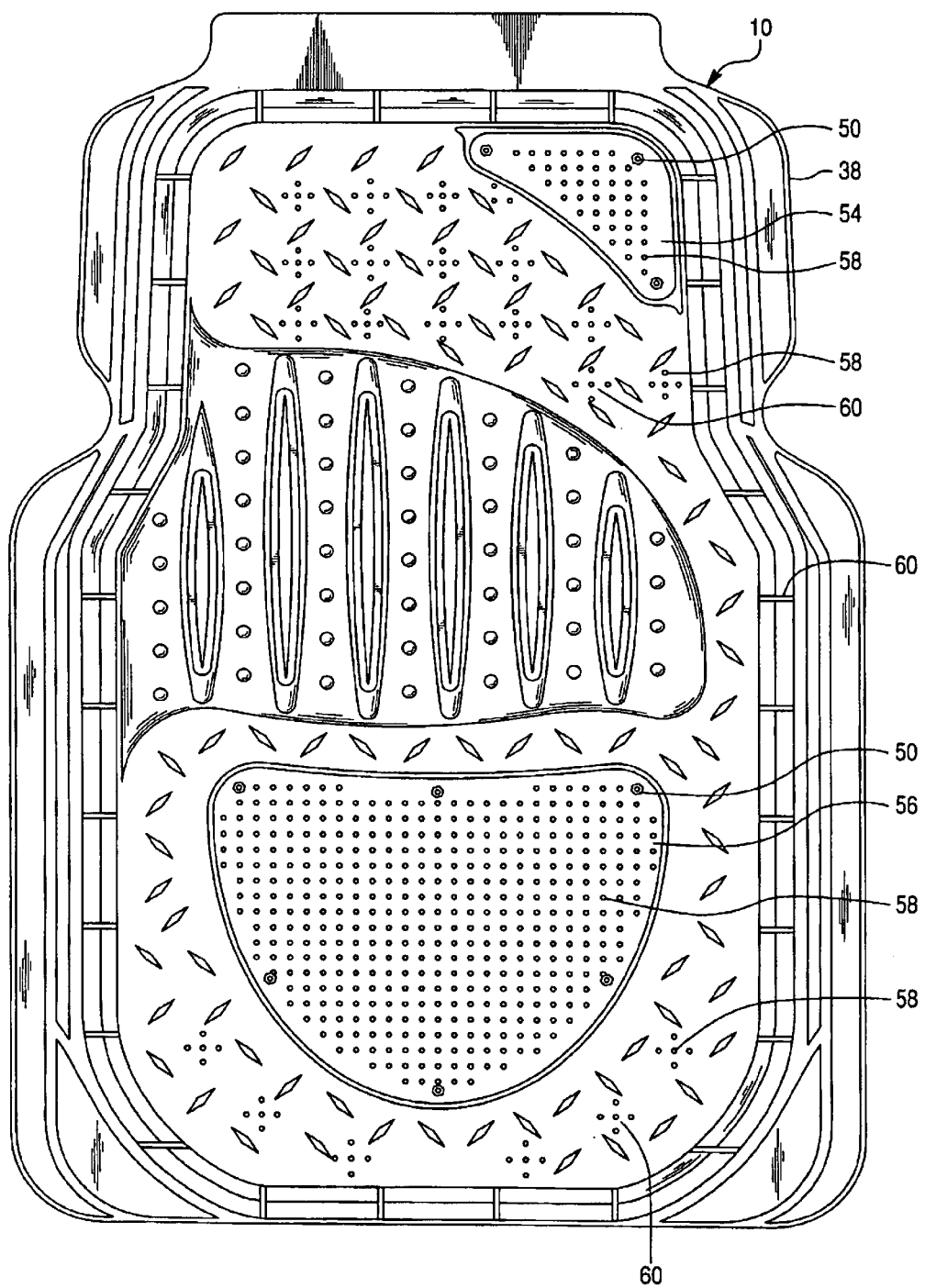
FIG. 2 is a bottom plan view of the floor mat according to the present invention.
Figure 5:
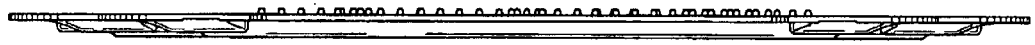
FIG. 5 is a front elevational view of FIG. 2.
Figure 6:
FIG. 6 is a front elevational view of FIG. 1.
Figure 7:
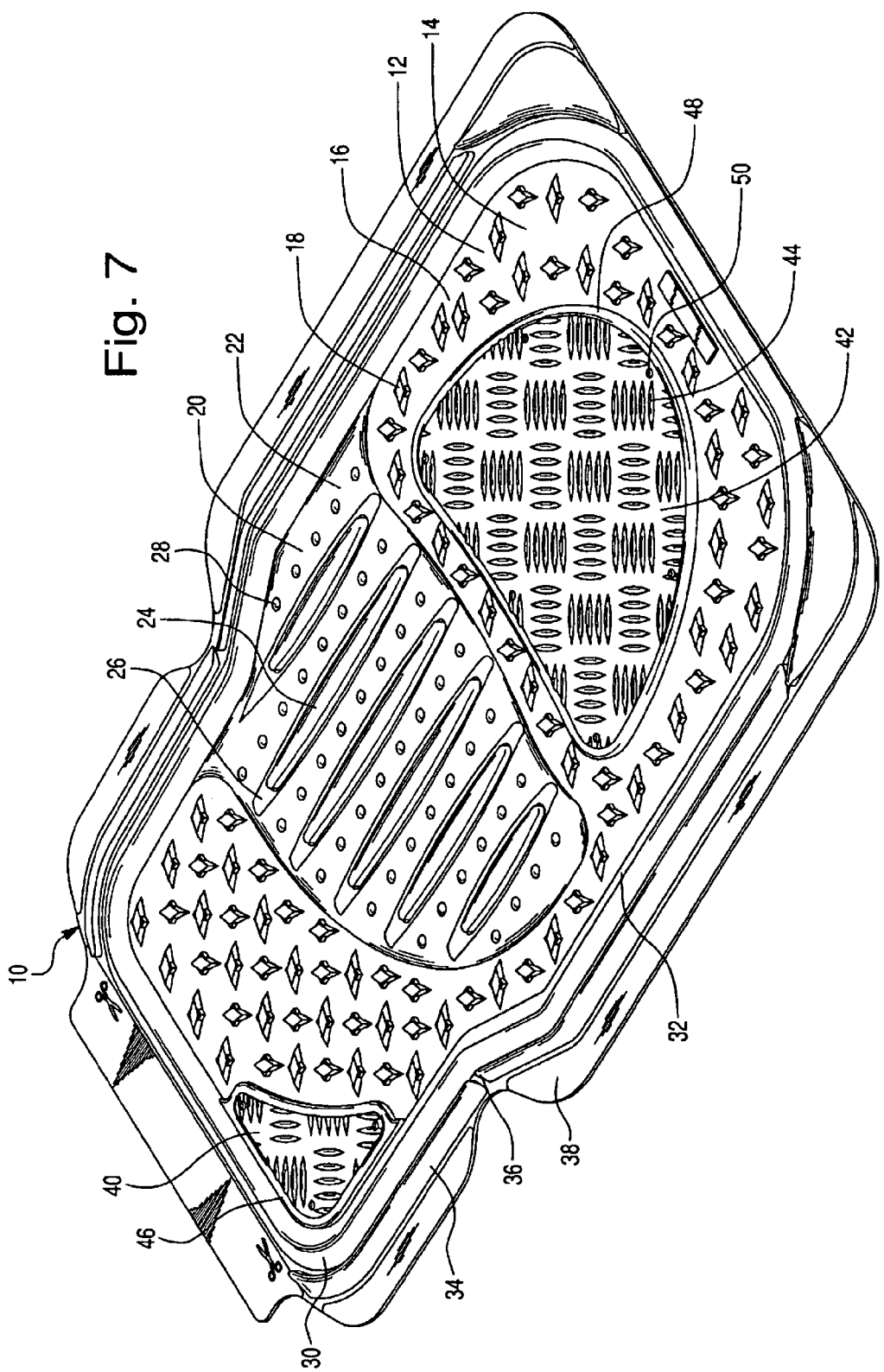
FIG. 7 is a perspective view of the floor mat according to the invention.

Referring to the Figures, the present invention is shown generally as floor mat 10 which has a durable construction of molded rubber material, vinyl, or other suitable material which is moldable, flexible, and durable. The floor mat is typically positioned on the interior floor surface of a vehicle cab in front of a driver or passenger seat to protect the underlying surface. The floor mat 10 has a texturized front surface 12 comprising a first area 14 having a first recessed bottom surface 16. A pattern of raised diamond shaped protrusions 18 substantially covers the first area 14. The diamond shaped protrusions 18 cover an upper and a lower portion of the floor mat to provide a texturized surface against which a person's shoes can rub to remove dirt debris and moisture, which can then collect in the bottom surface 16. The upper portion of the floor mat is typically positioned against an inclined surface of the firewall of the vehicle underneath the vehicle pedals, and the lower portion of the floor mat is usually horizontally positioned in front of the seat. The texturized surface of the floor mat 10 further provides traction for a person bearing their shoes against allowing for easy positioning of the person within their seat.

The floor mat front surface 12 has a second area 20 with a second recessed bottom surface 22. A plurality of raised parallel lengthwise ridges 24 are provided within lengthwise indentations 26. The lengthwise indentations 26 have a lower bottom surface relative to the second recessed bottom surface 22. The arrangement of the ridges and indentations provide an area to scrape and collect dirt, mud and moisture from the bottoms of a passenger's shoes. This second area 20 is usually positioned in a transition area between the inclined upper portion of the floor mat and the level horizontal lower portion of the mat, so dirt and moisture removed or collected from the upper portion of the first area of the floor mat may fall into the second area, and be collected within the indentations 26. In between the ridges 24 are rows of spaced raised bumps 28 which further aid to scrape mud and provide traction.

A continuous raised inner lip 30 and grooved channel 32 are provided around the first and second areas 14, 16 of the floor mat 10 for containing and collecting dirt, debris, liquid and moisture within the grooved channel. The inner lip 30 is surrounded by discontinues outer lip sections 34 and a second grooved channel is provided between the inner lip 30 and outer lip sections 34. Additionally, draining channels 36 are spaced between the outer lip sections 34 to allow for excess moisture or liquid to drain from the second channel between the inner lip 30 and the outer lip sections 34. Around the periphery of the floor mat 10 are a number of bendable wing-like flaps 38 which are generally flat and thin. The bendable flaps can be positioned against curved portions or walls of the interior of the vehicle, such as against the inner lower wall of the door sill and the middle hump wall between the floor portions of the front seats. With the flaps positioned against these walls in a curved manner, excess moisture is contained on the floor mat. Since the flaps are relatively thin compared to the overall thickness of the floor mat, the flaps can be trimmed down with scissors if desired, to achieve the best fit of the floor mat for a particular floor area.

Figure 8:
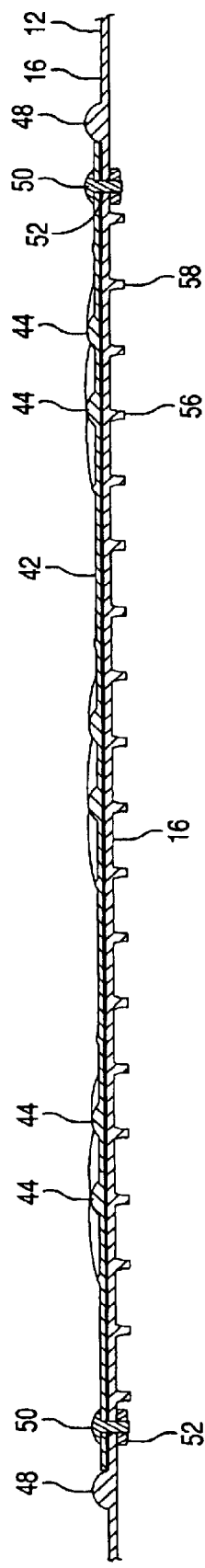
FIG. 8 is a cross-sectional view of FIG. 1 taken along line VIII—VIII.

The floor mat according to the invention is provided with a texturized metal toe plate 40 and a texturized metal heel plate 42. The toe plate 40 is adjacent the first area of the floor mat which is typically positioned under the vehicle floor pedals so that a driver may extend their foot to the toe plate and bear against the toe plate. Also the toe plate may be positioned under a clutch or other pedal to protect the floor mat surface from excessive pedal wear. The heel plate 42 is provided in the lower center of the floor mat where a passenger's shoes would rest or bear against when not operating the vehicle. The toe plate 40 and heel plate 42 are provided with a pattern of raised almond-shaped ridges 44 arranged In a crisscrossed pattern of groups of five ridges or any other diamond shape pattern. The ridges 44 provide a scraping surface for shoes and a wear resistant plate surface is general. The toe plate 42 and heel plate 44 are positioned on the recessed bottom 16 of the floor mat and are contained within surrounding walls 46, 48, respectively, which are raised from the recessed bottom. The toe and heel plates are maintained in position by a plurality of rivets 50. The rivets pass through the floor mat at rivet holes 52, as view in FIG. 8.

Referring to FIGS. 2–6, the back surface of the floor mat 10 will be described. The back surface of the floor mat is substantially smooth and a reverse pattern of the front surface of diamond protrusions, ridges and bumps, and lips and channels, remains from the floor mat molding process. Two main gripping sections 54, 56 are provided behind the attached toe and heel plates 42, 44, respectively. The gripping sections 54, 56 comprise a plurality of vertically extending protrusions 58 which are uniformly spaced thereover. Additional gripping portions 60 are spaced in small clusters of five protrusions 58 between the reverse pattern of diamond protrusions at the upper and lower sections of the floor mat 10. The gripping sections 54, 56 and gripping portions 60 bear against the underlying vehicle floor surface and the protrusions 58 provide a slip resistant grip between the floor surface and the floor mat. The back surface of the floor mat is provided with reinforcing ribs 62 backing the inner lip 30 to maintain the raised formation of the inner lip.

It will be understood that the shaped of the depicted floor mat 10 fits a profile of the drivers side of a work vehicle. The floor mats of the invention are also useful on the passenger side and back seat floor areas, and in cargo areas of a vehicle. In use the floor mat is simply positioned on the floor to be protected. In the present embodiment the left side of the floor mat would be positioned against the door sill, the right side At positioned against the center hump, and the top side of the floor mat would be positioned against the surface of the firewall at the vehicle pedals. Upon a slight downward pressure exerted on the mat, the protrusions on the backside of the floor mat interact with the floor surface, carpeted or otherwise to maintain the floor mat position. The double lip surrounding the edges of the floor mat is designed to contain the contents collected on the mat.

In due course the flexible floor mat is easily and readily removed from the vehicle by simply lifting it vertically and out from the vehicle. It will be understood that the mats of the invention are custom made to conform with a particular vehicles interior area. Excess floor mat material can ultimately be trimmed of the molder floor mat and discarded as waste. The resulting floor mat has a high quality construction and is laid within the floor compartment with no substantial folds or wrinkles. Having thus described the invention in its preferred embodiment, it will be understood by those skilled in the art that modifications or changes in details of the invention may be implemented without departing from the spirit and scope of the invention as defined in the following claims.

What is claimed is:

1. A vehicle floor mat comprising:
   a molded flexible mat having a raised peripheral lip provided on side edges of the molded mat;
   a first area contained within the peripheral lip, said first area having a recessed bottom surface and a plurality of raised protrusions extending from said bottom surface thereby providing a texturized surface;
   at least one third area having a substantially smooth bottom surface, said at least one third area provided within said first area of the mat and adjacent to said texturized surface pattern; and
   at least one wear plate fixed upon said smooth bottom surface of said at least one third area of said molded mat.

2. The vehicle floor mat according to claim 1, further comprising:
   a second area contained within the peripheral lip, said second area having a recessed floor and a plurality of elongated parallel ridges protruding from the recessed floor.

3. The vehicle floor mat according to claim 2, wherein said second area further comprises a plurality of raised bumps on the recessed floor in between the parallel ridges.

4. The vehicle floor mat according to claim 3, wherein said first area of the molded mat generally covers an upper section and a lower section of a substantial floor area of the mat, and said second area of the molded mat generally covers a middle section of the substantial floor area of the mat.

5. The vehicle floor mat according to claim 4, wherein said at least one wear plate comprises a heel plate located in the lower section of the mat.

6. The vehicle floor mat according to claim 4, wherein said at least one wear plate comprises a toe plate located in the upper section of the mat.

7. The vehicle floor mat according to claim 4, wherein said at least one wear plate comprises a toe plate located in the upper section of the mat and a heel plate located in the lower section of the mat.

8. A vehicle floor mat comprising:
a molded flexible mat having a front surface with a raised peripheral lip provided on side edges of the molded mat;
a first area contained within the peripheral lip, said first area having a first texturized surface pattern;
a second area contained within the peripheral lip, said second area having a second texturized surface pattern different from said first pattern, wherein said first area of the molded mat generally covers an upper section and a lower section of a substantial floor area of the mat, and said second area of the molded mat generally covers a middle section of the substantial floor area of the mat;
at least one third area having a substantially smooth recessed bottom surface, said at least one third area provided within said first area of the mat adjacent to said first texturized surface pattern; and
at least one wear plate fixed upon said recessed bottom surface of said at least one third area of said molded mat.

9. The vehicle floor mat according to claim 8, wherein said at least one wear plate is surrounded at its edges by a contoured wall, raised and extending up from the bottom surface.

10. The vehicle floor mat according to claim 8, wherein said at least one wear plate comprises a metal plate having a texturized surface pattern.

11. The vehicle floor mat according to claim 8, wherein said at least one wear plate comprises a toe plate located in the upper section of the mat and a heel plate located in the lower section of the mat.

12. The vehicle floor mat according to claim 8, further comprising a back side of the molded mat, said back side having at least one gripping section for gripping the vehicle floor, said gripping section having a plurality of outwardly extending protrusions.

13. The vehicle floor mat according to claim 12 wherein said at least one gripping section located on the back side of the mat opposite said wear plate fixed to the front surface of the mat.

14. The vehicle floor mat according to claim 1, wherein said at least one wear plate comprises a metal plate having a texturized surface pattern.

15. The vehicle floor mat according to claim 1, wherein said at least one third area is contained within a surrounding wall raised and extending up from said bottom surface.

16. The vehicle floor mat according to claim 10, wherein said metal plate is fixed upon said smooth bottom surface of said at least one third area of the molded mat by a plurality of rivets passing through said floor mat.

17. The vehicle floor mat according to claim 14, wherein said metal plate is fixed upon said smooth bottom surface of said at least one third area of the molded mat by a plurality of rivets oassing through said floor mat.

18. A vehicle floor mat comprising:
a molded flexible mat having a front surface with a raised peripheral lip provided on side edges of the molded mat;
a first area contained within the peripheral lip, said first area having a first texturized surface pattern;
a second area contained within the peripheral lip, said second area having a second texturized surface pattern different from said first pattern, wherein said first area of the molded mat generally covers an upper section and a lower section of a substantial floor area of the mat, and said second area of the molded mat generally covers a middle section of the substantial floor area of the mat;
at least one third area having a recessed bottom surface; and
at least one metal plate having a texturized surface pattern and fixed upon said recessed bottom surface of said at least one third area of the molded mat, said at least one metal plate is surrounded at its edges by a contoured wall raised and extending up from said recessed bottom surface,
wherein said metal plate is fixed upon said recessed bottom surface of said at least one third area of said molded mat by a plurality of rivets passing through said floor mat.

* * * * *